(12) United States Patent
Mercer et al.

(10) Patent No.: US 9,176,937 B2
(45) Date of Patent: Nov. 3, 2015

(54) ENSURING USER INTERFACE SPECIFICATION ACCURATELY DESCRIBES USER INTERFACE AFTER UPDATES TO USER INTERFACE

(75) Inventors: Kathryn L. Mercer, Raleigh, NC (US); Adrian X. Rodriguez, Durham, NC (US); Rupal S. Soneji, Morrisville, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 13/440,012

(22) Filed: Apr. 5, 2012

(65) Prior Publication Data

US 2013/0268827 A1 Oct. 10, 2013

(51) Int. Cl.
  G06F 17/22 (2006.01)
  G06F 17/30 (2006.01)
  G06F 9/44 (2006.01)
  G06F 9/445 (2006.01)

(52) U.S. Cl.
  CPC .............. *G06F 17/2229* (2013.01); *G06F 8/38* (2013.01); *G06F 8/73* (2013.01); *G06F 8/74* (2013.01); *G06F 17/30873* (2013.01); *G06F 8/65* (2013.01); *G06F 2216/15* (2013.01)

(58) Field of Classification Search
  CPC . G06F 8/73; G06F 17/2229; G06F 17/30873; G06F 2216/15; G06F 8/38; G06F 8/74
  USPC .......... 715/203, 205, 234, 277; 717/104, 105, 717/123
  See application file for complete search history.

(56) References Cited

U.S. PATENT DOCUMENTS 5,884,081 A * 3/1999 Burbeck ................... 717/128
6,085,206 A * 7/2000 Domini et al. ............. 715/257
6,199,198 B1 * 3/2001 Graham ..................... 717/105
6,701,517 B1 * 3/2004 Moore et al. ............... 717/121

(Continued)

OTHER PUBLICATIONS

Jim Alves-Foss; Daniel Conte de Leon; Paul Oman, Experiments in the use of XML to enhance traceability between object-oriented design specifications and source code, 2002, IEEE Computer Society, Proceedings of the 35th Annual Hawaii International Conference on System Sciences (HICSS'02), vol. 9, pp. 276-.*

(Continued)

*Primary Examiner* — Cesar Paula
*Assistant Examiner* — Yahao Chen
(74) *Attorney, Agent, or Firm* — Robert A. Voigt, Jr.; Winstead, P.C.

(57) ABSTRACT

A method, system and computer program product for ensuring a user interface specification accurately describes its corresponding user interface. The system links sections of the user interface code with corresponding user interface objects. Furthermore, the system links these sections of the user interface code with corresponding sections of the user interface specification. Upon detecting a modification to the user interface code which reflects an update to the user interface, the system notifies the user that the user interface specification needs to be updated. By linking the user interface objects to the user interface code and linking the user interface code to the corresponding sections of the user interface specification, appropriate modifications to the user interface specification can be recommended or implemented based on the modifications to the corresponding sections of the user interface code, which reflect the changes to the corresponding objects on the user interface.

12 Claims, 9 Drawing Sheets

(56) References Cited

U.S. PATENT DOCUMENTS

| | | | |
|---|---|---|---|
| 7,127,675 B1 | 10/2006 | Kates et al. | |
| 7,370,315 B1* | 5/2008 | Lovell et al. | 717/100 |
| 7,640,532 B2* | 12/2009 | Jain et al. | 717/102 |
| 7,788,640 B2 | 8/2010 | Grimaldi | |
| 7,934,158 B2 | 4/2011 | McLean | |
| 8,191,044 B1* | 5/2012 | Berlik et al. | 717/124 |
| 8,429,604 B1* | 4/2013 | Blas et al. | 717/113 |
| 8,522,196 B1* | 8/2013 | Kim et al. | 717/105 |
| 8,639,542 B2* | 1/2014 | Berg et al. | 705/7.11 |
| 2002/0059348 A1 | 5/2002 | Lee et al. | |
| 2002/0112225 A1* | 8/2002 | Charisius et al. | 717/125 |
| 2002/0116702 A1* | 8/2002 | Aptus et al. | 717/170 |
| 2004/0153992 A1* | 8/2004 | Molina-Moreno et al. | 717/105 |
| 2005/0203865 A1* | 9/2005 | Sundararajan et al. | 707/1 |
| 2006/0200767 A1* | 9/2006 | Glaeske et al. | 715/700 |
| 2006/0206865 A1* | 9/2006 | Reinhardt et al. | 717/108 |
| 2006/0282837 A1* | 12/2006 | Almeida | 718/104 |
| 2007/0013697 A1* | 1/2007 | Gilboa | 345/440 |
| 2007/0050180 A1* | 3/2007 | Dori | 703/6 |
| 2007/0067341 A1* | 3/2007 | Chen et al. | 707/104.1 |
| 2007/0149036 A1* | 6/2007 | Misovski | 439/419 |
| 2007/0162522 A1* | 7/2007 | Sengupta et al. | 707/203 |
| 2007/0168921 A1* | 7/2007 | Bailleul et al. | 717/104 |
| 2007/0209031 A1* | 9/2007 | Ortal et al. | 717/104 |
| 2007/0214427 A1 | 9/2007 | Peck et al. | |
| 2008/0229261 A1* | 9/2008 | Rajamani et al. | 716/5 |
| 2008/0250392 A1* | 10/2008 | Petri | 717/120 |
| 2008/0250394 A1 | 10/2008 | Jones et al. | |
| 2008/0263504 A1* | 10/2008 | Marius et al. | 717/100 |
| 2008/0275910 A1* | 11/2008 | Molina-Moreno et al. | 707/103 R |
| 2009/0037884 A1* | 2/2009 | Benameur et al. | 717/126 |
| 2009/0083697 A1* | 3/2009 | Zhang et al. | 717/105 |
| 2009/0158243 A1* | 6/2009 | Bolarinwa | 717/105 |
| 2009/0183066 A1 | 7/2009 | Crawford et al. | |
| 2009/0282065 A1* | 11/2009 | Brimble et al. | 707/101 |
| 2009/0293005 A1* | 11/2009 | Hooyman | 715/762 |
| 2010/0050152 A1* | 2/2010 | Gilboa | 717/106 |
| 2010/0064208 A1* | 3/2010 | Valtchev | 715/234 |
| 2010/0228529 A1* | 9/2010 | Choudhury et al. | 703/2 |
| 2010/0293480 A1 | 11/2010 | Shivananda et al. | |
| 2011/0119231 A1 | 5/2011 | Namburu et al. | |
| 2011/0202933 A1 | 8/2011 | Sherrill | |
| 2011/0301996 A1* | 12/2011 | Johnson et al. | 705/7.26 |
| 2012/0089929 A1* | 4/2012 | Ohta et al. | 715/762 |
| 2012/0227027 A1* | 9/2012 | Boulila | 717/101 |
| 2013/0080140 A1* | 3/2013 | Behr et al. | 703/21 |
| 2013/0117725 A1* | 5/2013 | Bnayahu et al. | 717/101 |
| 2013/0219292 A1* | 8/2013 | Vins et al. | 715/751 |
| 2014/0013209 A1* | 1/2014 | Good | 715/235 |
| 2014/0026115 A1* | 1/2014 | Bank et al. | 717/113 |

OTHER PUBLICATIONS

Nokia, S60 UI Specification Guideline, May 8, 2006, Version 1.0, <URL: http://www.williamhowley.com/documents/S6O_UI_Specification_Guideline_v1_0_en.pdf>, Retrieved on Aug. 26, 2014.*

Paul Coulton, Reuben Edwards, Helen Clemson. S60 Programming—A Tutorial Guide. 2007. John Wiley & Sons Ltd. Chapter 5 Storing Data, pp. 103-151. ISBN 978-0-470-02765-3.*

* cited by examiner

ENSURING USER INTERFACE SPECIFICATION ACCURATELY DESCRIBES USER INTERFACE AFTER UPDATES TO USER INTERFACE

TECHNICAL FIELD

The present invention relates generally to user interfaces for computer programs, and more particularly to ensuring that the user interface specification accurately describes the user interface after updates to the user interface.

BACKGROUND

User interfaces provide a mechanism that allows human beings to interact with computer systems. A wide variety of user interfaces exist. User interfaces may include menus, windows, buttons, tables, icons and a variety of other graphical means for representing functionality, operations, or elements of a computer program.

A user interface specification is a document that captures the details of the user interface into a written document. The specification covers all possible actions that an end user may perform and all visual, auditory and other interaction elements. The user interface specification is the main source of implementation information for how the software should work.

When a user interface is updated (e.g., modifying the name of a button), the user interface specification may need to be updated as well. Corresponding updates to the user interface specification is especially important in lean and agile software development, which may involve iterative and incremental development, since the user interface specification is used for testing the user interface throughout the development process.

However, in many cases, the user interface specification fails to be updated. As a result, the user interface specification becomes stale and inaccurate.

Attempts have been made to update the user interface specification by manually examining the user interface for changes, and then, after noticing changes, generating a new user interface specification by translating the macros (rules or patterns that specify how a certain input sequence should be mapped to an output sequence) and program instructions of the user interface code (e.g., markup languages, such as HyperText Markup Language (HTML)) into a newly generated user interface specification after recording the macros and program instructions. However, whenever the code for the user interface language is modified, the user would be required to re-record all of the macros and program instructions of the user interface code to generate an updated user interface specification. Such a process is inefficient and time-consuming.

BRIEF SUMMARY

In one embodiment of the present invention, a method for ensuring a user interface specification accurately describes its corresponding user interface comprises linking one or more sections of user interface code with one or more user interface objects. The method further comprises linking the one or more sections of the user interface code with corresponding sections of the user interface specification. In addition, the method comprises notifying, by a processor, a user that the user interface specification needs to be updated in response to detecting a modification of the user interface code which reflects an update to the user interface.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for ensuring a user interface specification accurately describes its corresponding user interface. In one embodiment of the present invention, the system links sections of the user interface code (e.g., markup language such as HyperText Markup Language (HTML)) with corresponding user interface objects (e.g., buttons). Furthermore, the system links these sections of the user interface code with corresponding sections of the user interface specification. Upon detecting a modification to the user interface code which reflects an update to the user interface, the system notifies the user that the user interface specification needs to be updated. By linking the user interface objects to the user interface code, modifications to the user interface will be detected in modifications to the user interface code. Furthermore, by linking the user interface code to the corresponding sections of the user interface specification, appropriate modifications to the user interface specification can be recommended or implemented based on the modifications to the corresponding sections of the user interface code, which reflect the changes to the corresponding objects on the user interface. In this manner, the user interface specification can be modified to accurately describe its corresponding user interface after updates to the user interface.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
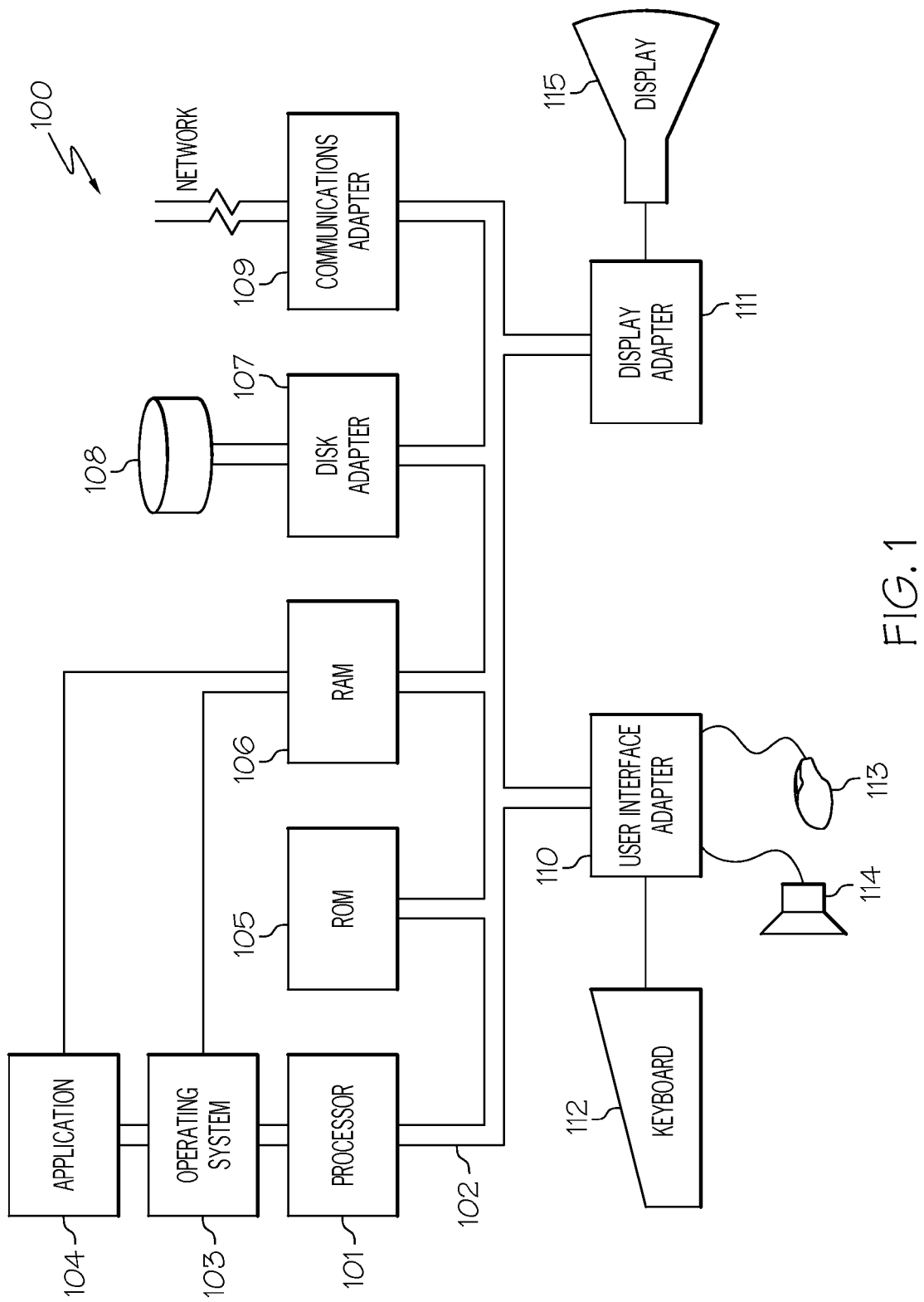
FIG. 1 illustrates a hardware configuration of a computer system in accordance with an embodiment of the present invention.

Referring now to the Figures in detail, FIG. 1 illustrates a hardware configuration of a computer system 100 which is representative of a hardware environment for practicing the present invention. Computer system 100 has a processor 101 coupled to various other components by system bus 102. An operating system 103 runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104. Application 104 may include, for example, a program for ensuring that the user interface specification accurately describes the user interface after updates to the user interface as discussed further below in association with FIGS. 2-9.

Referring again to FIG. 1, read-only memory ("ROM") 105 is coupled to system bus 102 and includes a basic input/output system ("BIOS") that controls certain basic functions of computer system 100. Random access memory ("RAM") 106 and disk adapter 107 are also coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the program for ensuring that the user interface specification accurately describes the user interface after updates to the user interface, as discussed further below in association with FIGS. 2-9, may reside in disk unit 108 or in application 104.

Computer system 100 may further include a communications adapter 109 coupled to bus 102. Communications adapter 109 interconnects bus 102 with an outside network thereby enabling computer system 100 to communicate with other such systems.

I/O devices may also be connected to computer system 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computer system 100 through keyboard 112 or mouse 113 and receiving output from computer system 100 via display 115 or speaker 114.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, when a user interface is updated (e.g., modifying the name of a button), the user interface specification may need to be updated as well. Corresponding updates to the user interface specification is especially important in lean and agile software development, which may involve iterative and incremental development, since the user interface specification is used for testing the user interface throughout the development process. However, in many cases, the user interface specification fails to be updated. As a result, the user interface specification becomes stale and inaccurate. Attempts have been made to update the user interface specification by manually examining the user interface for changes, and then, after noticing changes, generating a new user interface specification by translating the macros and program instructions of the user interface code into a newly generated user interface specification after recording the macros and program instructions. However, whenever the code for the user interface language is modified, the user would be required to re-record all of the macros and program instructions of the user interface code to generate an updated user interface specification. Such a process is inefficient and time-consuming.

Figure 2:
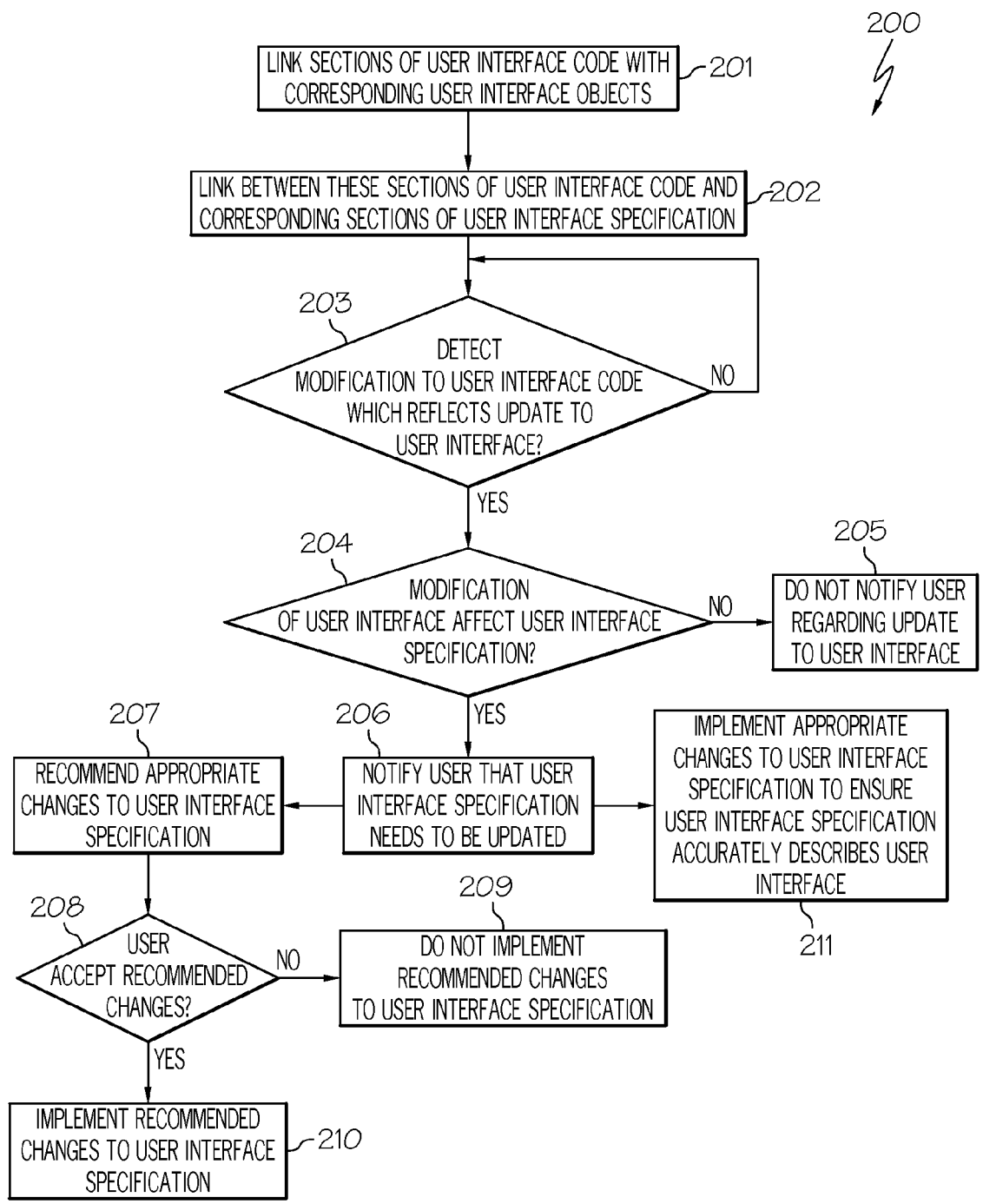
FIG. 2 is a flowchart of a method for ensuring a user interface specification accurately describes its corresponding user interface in accordance with an embodiment of the present invention.
Figure 3:
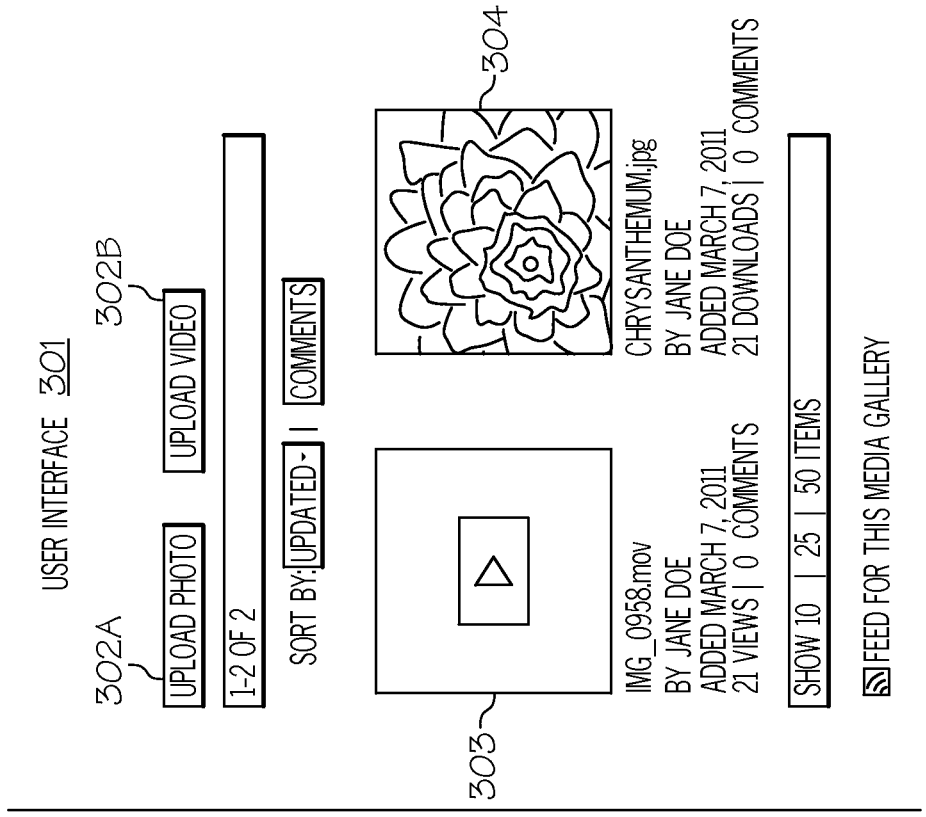
FIG. 3 illustrates an exemplary user interface specification describing a corresponding user interface in accordance with an embodiment of the present invention.
Figure 4:
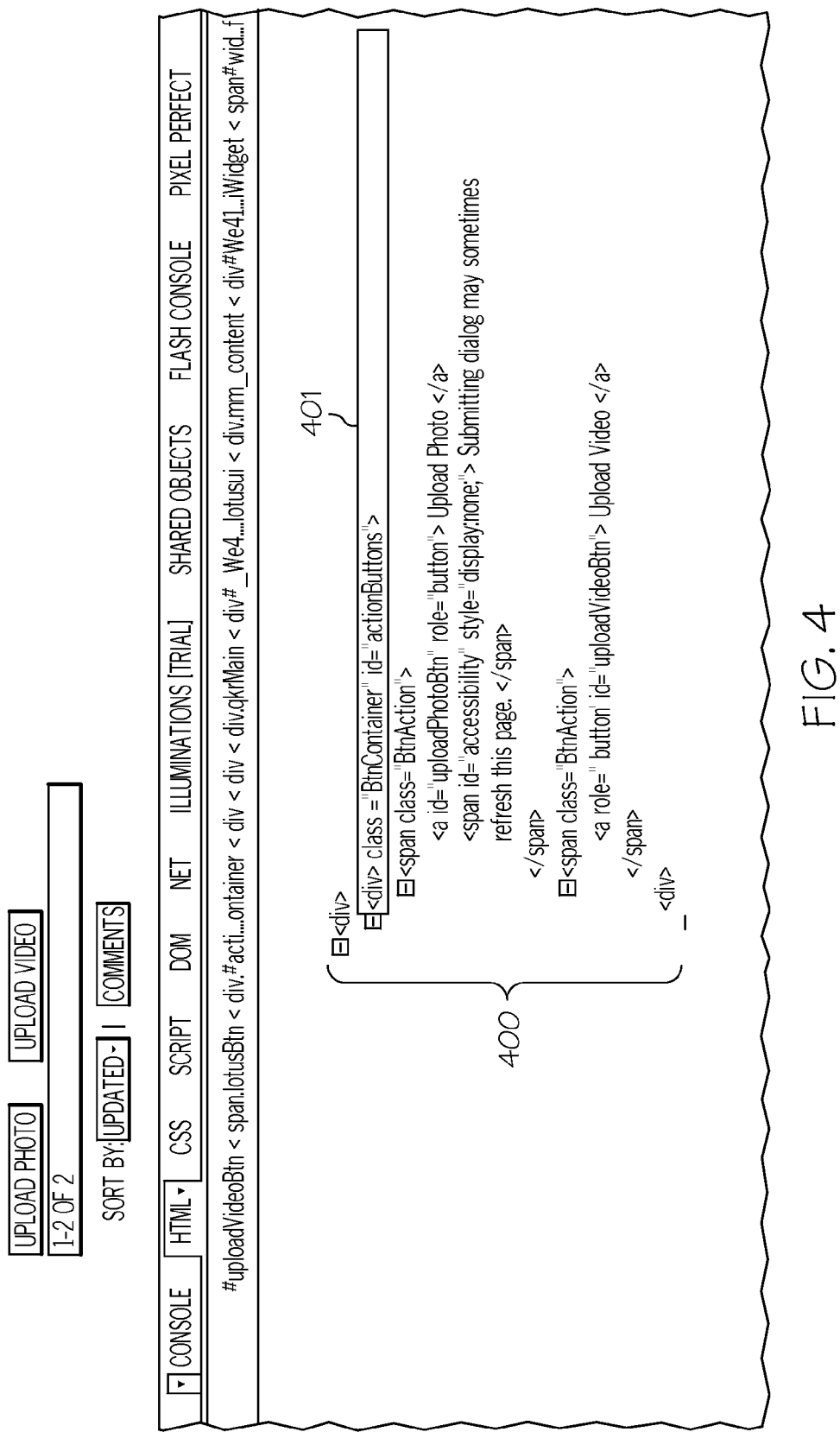
FIG. 4 illustrates linking sections of the user interface code with corresponding user interface objects in accordance with an embodiment of the present invention.
Figure 5:
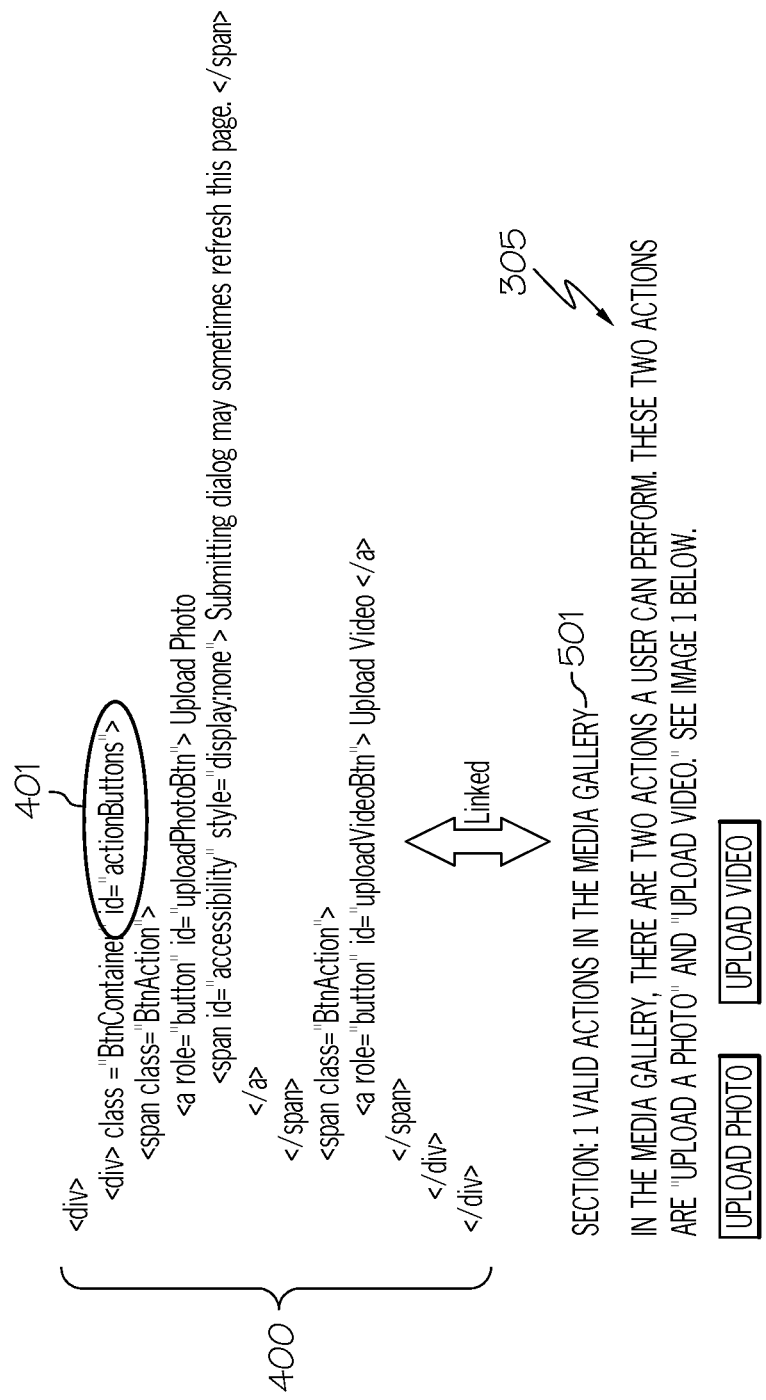
FIG. 5 illustrates linking between these sections of the user interface code and corresponding sections of the user interface specification in accordance with an embodiment of the present invention.
Figure 6:
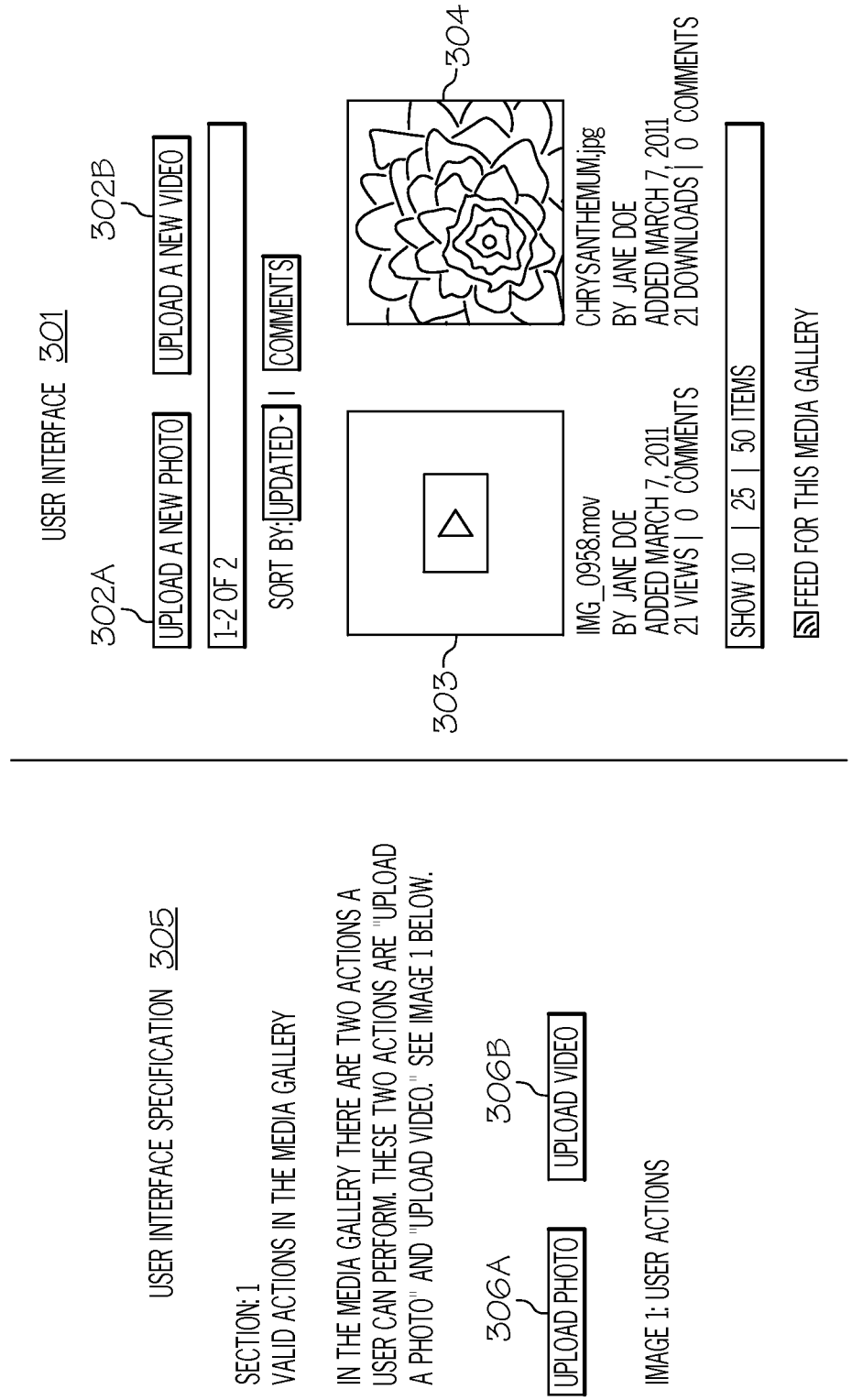
FIG. 6 illustrates exemplary modifications to the user interface in accordance with an embodiment of the present invention.
Figure 7:
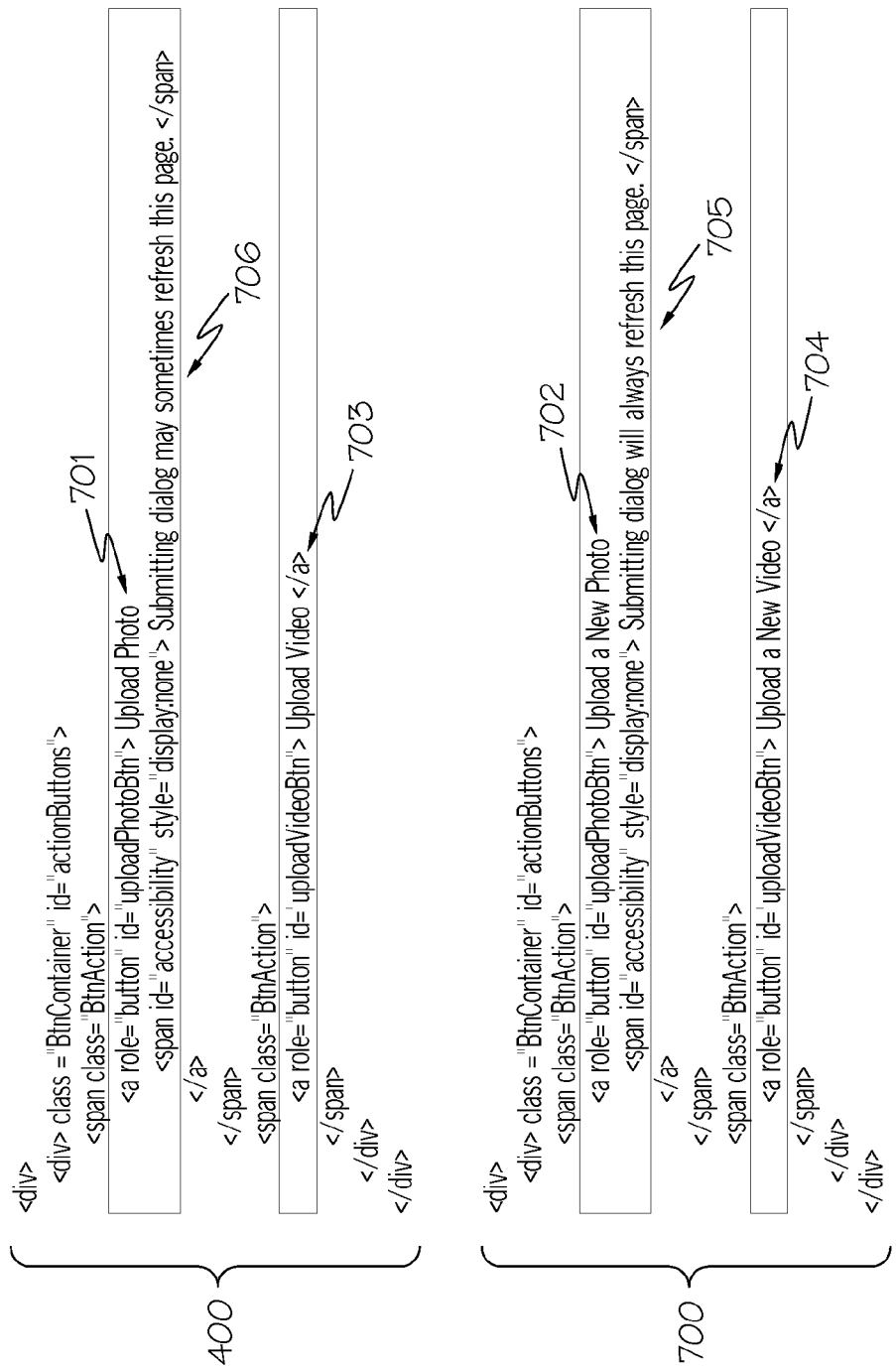
FIG. 7 illustrates modifications made to the user interface code corresponding to the modifications made to the user interface illustrated in FIG. 6 in accordance with an embodiment of the present invention.
Figure 8:
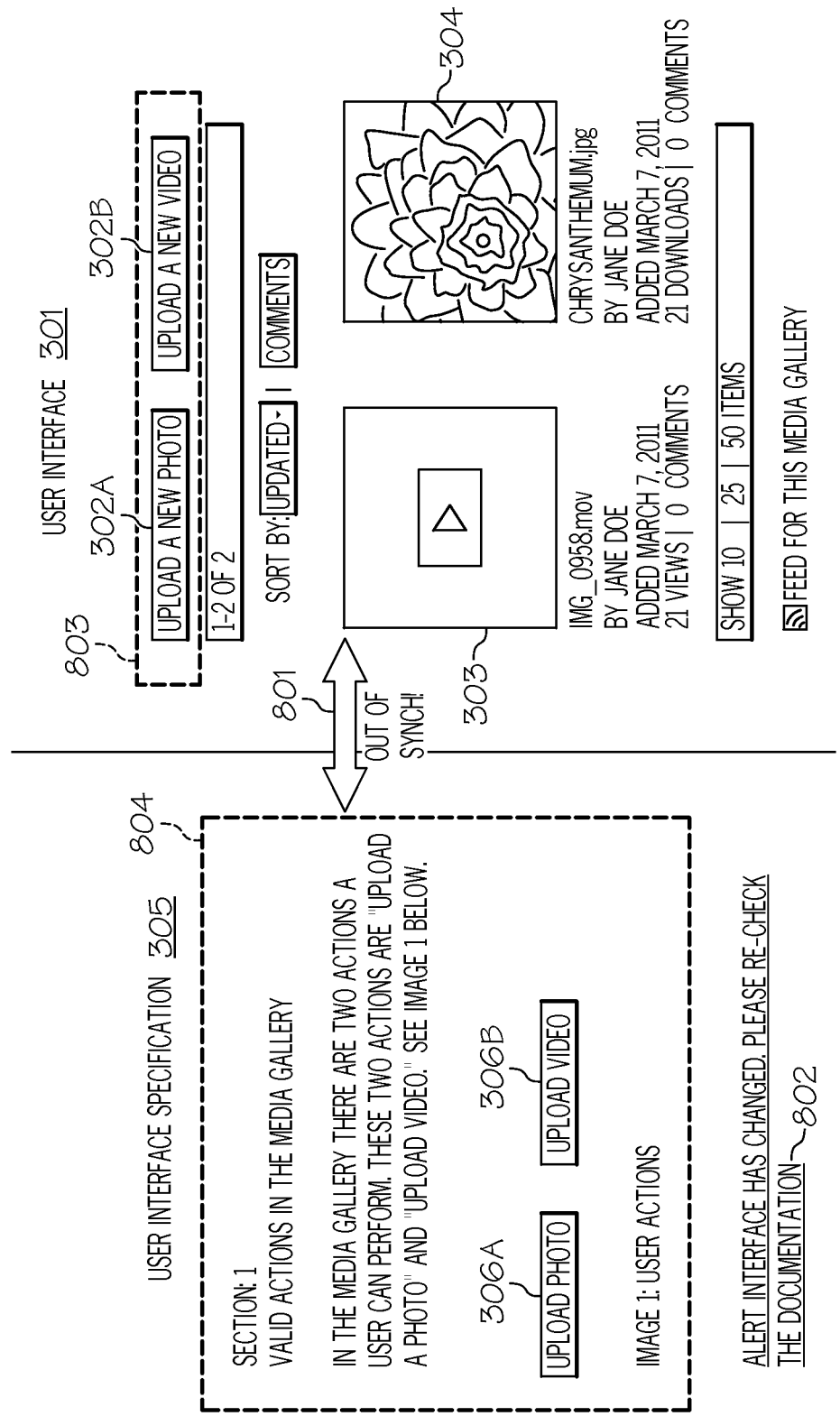
FIG. 8 illustrates notifying a user that the user interface specification needs to be updated in accordance with an embodiment of the present invention.
Figure 9:
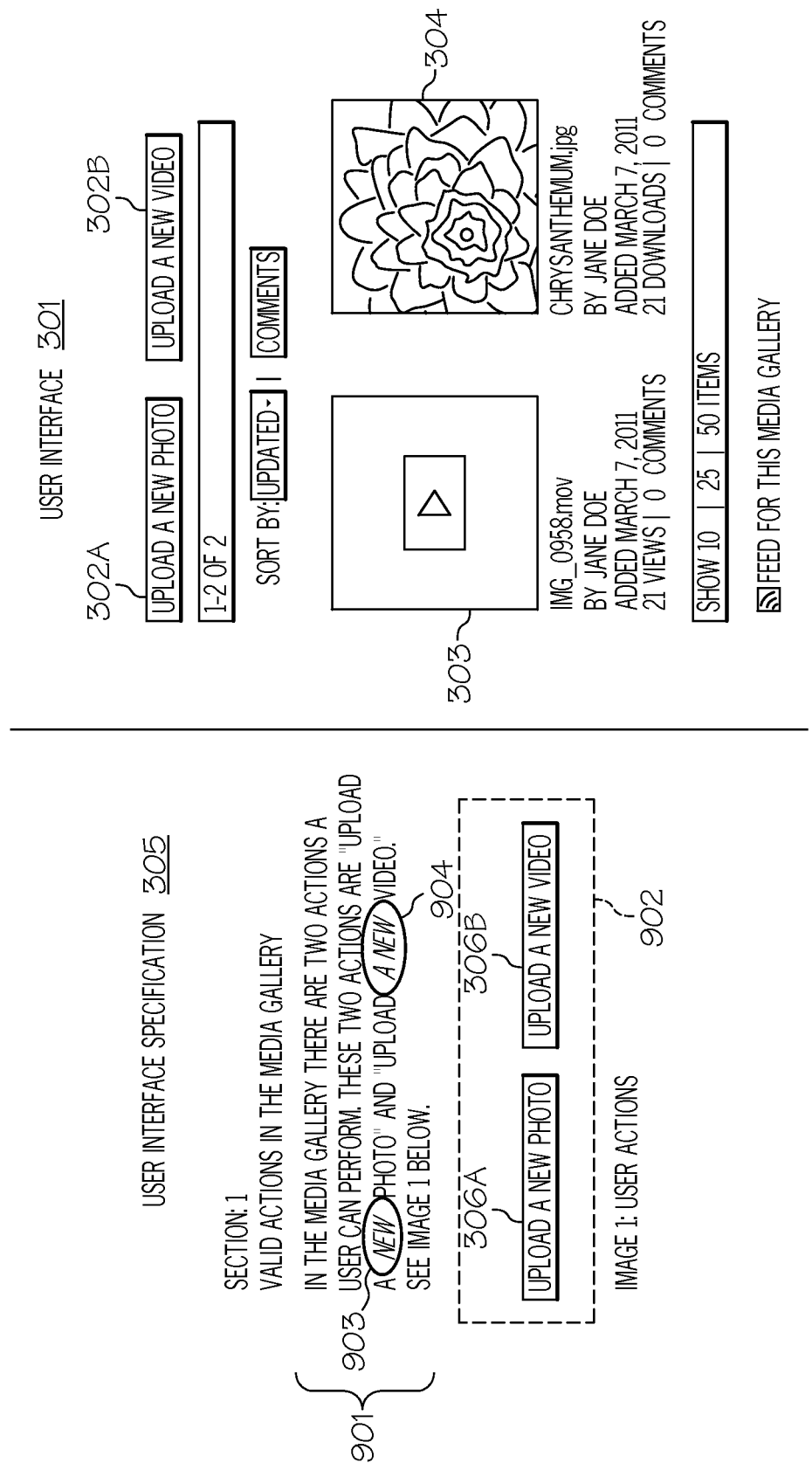
FIG. 9 illustrates recommending appropriate changes to the user interface specification in accordance with an embodiment of the present invention.

The principles of the present invention provide a means for ensuring that the user interface specification accurately describes the corresponding user interface without requiring a user to manually examine the user interface for changes as well as without the requirement of re-recording the macros and program instructions of the user interface code as discussed further below in connection with FIGS. 2-9. FIG. 2 is a flowchart of a method for ensuring a user interface specification accurately describes its corresponding user interface. FIG. 3 illustrates an exemplary user interface specification describing a corresponding user interface. FIG. 4 illustrates linking sections of the user interface code with corresponding user interface objects. FIG. 5 illustrates linking between these sections of the user interface code and corresponding sections of the user interface specification. FIG. 6 illustrates exemplary modifications to the user interface. FIG. 7 illustrates modifications made to the user interface code corresponding to the modifications made to the user interface illustrated in FIG. 6. FIG. 8 illustrates notifying a user that the user interface specification needs to be updated. FIG. 9 illustrates recommending appropriate changes to the user interface specification.

As stated above, FIG. 2 is a flowchart of a method 200 for ensuring a user interface specification accurately describes its corresponding user interface in accordance with an embodiment of the present invention. FIG. 2 will be discussed in conjunction with FIGS. 3-9, which illustrate various steps described in FIG. 2 in accordance with an embodiment of the present invention.

Referring to FIG. 2, in conjunction with FIG. 1, in step 201, system 100 links sections of the user interface code (e.g., markup language such as HyperText Markup Language (HTML)) with corresponding user interface objects as illustrated in FIGS. 3 and 4. User interface code, as used herein, refers to any code that is used to render and describe graphical user interfaces and controls. Examples of such user interface code include markup languages, such as HTML and Extensible Markup Language (XML), as well as style sheet languages, such as Cascading Style Sheets (CSS), etc.

FIG. 3 illustrates an exemplary user interface specification describing a corresponding user interface in accordance with an embodiment of the present invention. Referring to FIG. 3, user interface 301 includes various buttons 302A, 302B, a graphical image 303 representing a movie to be downloaded (movie identified by "IMG_0958.mov") as well as a pictorial image 304 (image identified by "Chrysanthemum.jpg"). FIG. 3 further illustrates a user interface specification 305 that that describes the possible actions that an end user may perform and all visual, auditory and other interaction elements on the corresponding user interface 301. As illustrated in FIG. 3, user interface specification 305 includes a section (identified by "Section 1") that discusses the actions that may be performed in the media gallery, such as uploading a photo and uploading a video, which are enabled via button 306A (identified by "Upload Photo") and button 306B (identified by "Upload Video") (buttons 306A and 306B correspond to buttons 302A and 302B of user interface 301). As discussed in the Background, when a user modifies the user interface, such as by modifying button 302A of user interface 301 to recite "Upload New Photo" instead of reciting "Upload Photo," the modification may not be reflected in the corresponding user interface specification thereby causing the user interface specification to become stale and inaccurate. For instance, user interface specification 305 may still reference the original button name of "Upload Photo" instead of the updated button name of "Upload New Photo" for button 306A, which corresponds to button 302A of user interface 301. The principles of the present invention provide a means for ensuring that user interface specification 305 accurately describes its corresponding user interface 301 after updates to user interface 301, such as by referencing the updated button name of "Upload New Photo" instead of the original button name of "Upload Photo" for button 306A after the user modified button 302A of user interface 301 to recite "Upload New Photo," as discussed further below.

FIG. 4 illustrates linking sections of the user interface code with user interface objects in accordance with an embodiment of the present invention. Referring to FIG. 4, in conjunction with FIG. 3, section 401 of the user interface code 400 (e.g., HTML) that contains id="actionButtons" is linked to the corresponding objects (e.g., buttons 302A, 302B of user interface 301 shown in FIG. 3) of user interface 301. In one embodiment, such linking may be accomplished via an inspect tool, such as Firebug®. By linking user interface objects to sections 401 of user interface code 400, modifications to user interface 301 will be detected by modifications to user interface code 400.

Returning to FIG. 2, in conjunction with FIGS. 1 and 3-4, in step 202, system 100 links these sections 401 of user interface code 400 (those that were previously linked to corresponding user interface objects) to corresponding sections of user interface specification 305 as illustrated in FIG. 5.

FIG. 5 illustrates linking between these sections 401 of user interface code 400 and corresponding sections of user interface specification 305 in accordance with an embodiment of the present invention. Referring to FIG. 5, section 401 of user interface code 400 that contains id="actionButtons" is linked with the corresponding section 501 of user interface specification 305 directed to "Section 1." By linking sections 401 of user interface code 400 to the corresponding sections 501 of user interface specification 305, appropriate modifications to user interface specification 305 can be recommended or implemented (discussed further below) based on the modifications to the corresponding sections of user interface code 400, which reflect the changes to the corresponding objects on user interface 301. In this manner, user interface specification 305 can be modified to accurately describe its corresponding user interface 301 after updates to user interface 301.

Returning to FIG. 2, in conjunction with FIGS. 1 and 3-5, in step 203, a determination is made by system 100 as to whether a modification to user interface code 400, which reflect the changes to the corresponding objects on user interface 301, is detected as illustrated in FIG. 6. FIG. 6 illustrates exemplary modifications to user interface 301 in accordance with an embodiment of the present invention. As illustrated in FIG. 6, the user changes button names 302A, 302B of user interface 301 to "Upload a New Photo" and "Upload a New Video," respectively. Furthermore, the user may also make changes to user interface 301 that are not necessarily reflected visually. For example, the user may change some of the accessibility text. For instance, as illustrated in FIG. 5, the span element with id="accessibility" is hidden from the screen and is used to communicate with the accessibility tools.

As a result of linking user interface objects (e.g., 302A, 302B of user interface 301) with sections 401 of user interface code 400, updates to user interface 301 will be detected by modifications to user interface code 400 as illustrated in FIG. 7.

FIG. 7 illustrates modifications made to user interface code 400 corresponding to the modifications made to user interface 301 illustrated in FIG. 6 in accordance with an embodiment of the present invention. As illustrated in FIG. 7, user interface code 400 was modified to update user interface 301 (as shown in FIG. 6) as reflected in the version of user interface code 700. For example, the button name of "Upload Photo" as shown in line 701 of user interface code 400 was modified to reflect the name of "Upload a New Photo" as shown in line 702 of user interface code 700. Furthermore, the button name of "Upload Video" as shown in line 703 of user interface code 400 was modified to reflect the name of "Upload a New Video" as shown in line 704 of user interface code 700. Additionally, as shown in FIG. 7, the accessibility text was modified to state "Submitting dialog will always refresh the page" as shown in line 705 of user interface code 700 from "Submitting dialog may sometimes refresh the page" as shown in line 706 of user interface code 400.

Referring to step 203, in conjunction with FIGS. 1 and 3-7, if a modification to user interface code 400 is not detected, then system 100 will continue to monitor for modifications to user interface code 400 in step 203.

If, however, a modification to user interface code 400 is detected, then, in step 204, a determination is made by system 100 as to whether the modification of user interface 301 (corresponding to the detected modification of user interface code 400) affects user interface specification 305. As discussed above, some modifications to user interface code 400 represent changes that are not reflected visually (e.g., modifications to accessibility text as discussed above in connection with FIG. 7) and hence may not affect user interface specification 305. If there were no modifications that affect user interface specification 305, then, in step 205, the user is not notified regarding the update to user interface 301.

If, however, there were modifications to user interface code 400 that affect user interface specification 305 (e.g., modifications to button names), then, in step 206, system 100 notifies the user that user interface specification 305 needs to be updated as illustrated in FIG. 8.

FIG. 8 illustrates notifying a user that user interface specification 305 needs to be updated in accordance with an embodiment of the present invention. As illustrated in FIG. 8, indications 801 ("out of synch!") and 802 ("Alert: interface has changed. Please re-check the document") may be presented to the user to inform the user that user interface specification 305 needs to be updated as a result of updates to user interface 301. In one embodiment, system 100 may further provide indication 803 of the objects being updated in user interface 301 and an indication 804 of the corresponding sections of user interface specification 305 that need to be updated. Such indications 803, 804 are a result of liking user interface objects with corresponding sections of the user interface 1 code and linking these sections of the user interface code to corresponding sections of the user interface specification.

In step 207, system 100 recommends appropriate changes to user interface specification 305 as illustrated in FIG. 9. FIG. 9 illustrates recommending appropriate changes to user interface specification 305 in accordance with an embodiment of the present invention.

Referring to FIG. 9, using the example of modifying buttons 302A, 302B on user interface 301 to now recite "Upload a New Photo" and "Upload a New Video," respectively, system 100 may present recommend changes to the description as shown in text 901, where the two actions are now described as "Upload a New Photo" and "Upload a New Video" rather than as originally described as "Upload a Photo" and "Upload Video" as illustrated in FIG. 3. Furthermore, as illustrated in FIG. 9, system 100 may present recommended modifications to buttons 306A, 306B, where button 306A now recites "Upload a New Photo" and button 306B now recites "Upload a New Video." In one embodiment, system 100 may highlight the proposed changes, such as by inserting a box 902 around buttons 306A, 306B recommended to be modified as well as by highlighting the terms 903, 904 (shown as italicized) in text 901 that are recommended to be modified.

Returning to FIG. 2, in conjunction with FIGS. 1 and 3-9, in step 208, a determination is made by system 100 as to whether the user accepts these recommended changes. If the user does not accept these recommended changes, then, in step 209, the recommend changes to user interface specification 305 are not implemented.

If, however, the user accepts these recommended changes, then, in step 210, system 100 implements the recommended changes to user interface specification 305.

In alternative to step 207, system 100, in step 211, automatically implements appropriate changes, such as those illustrated in FIG. 9, to user interface specification 305 to ensure that user interface specification 305 accurately describes its corresponding user interface 301.

In some implementations, method 200 may include other and/or additional steps that, for clarity, are not depicted. Further, in some implementations, method 200 may be executed in a different order presented and that the order presented in the discussion of FIG. 2 is illustrative. Additionally, in some implementations, certain steps in method 200 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for ensuring a user interface specification accurately describes its corresponding user interface, the method comprising:
    linking one or more sections of user interface code with one or more user interface objects;
    linking said one or more sections of said user interface code with corresponding sections of said user interface specification, wherein said user interface specification is a document that captures details of said user interface, wherein said details comprise actions of an end user and visual and auditory interaction elements;
    detecting a modification to said user interface code;
    determining whether a modification to said user interface corresponding to said detected modification of said user interface code affects said user interface specification;
    not notifying a user regarding an update to said user interface in response to said modification to said user interface code not affecting said user interface specification, wherein said modification to said user interface code does not affect said user interface specification in response to said modification to said user interface code representing changes that are not reflected visually;
    notifying, by a processor, said user that said user interface specification needs to be updated in response to detecting said modification to said user interface code affecting said user interface specification which reflects an update to said user interface; and
    recommending appropriate changes to said user interface specification in response to detecting said modification to said user interface code affecting said user interface specification, wherein said recommended changes to said user interface specification are based on said link between said one or more sections of said user interface code and said corresponding sections of said user interface specification, wherein said recommended changes include one or more identifiers of changes to one or more user interface objects that need to be reflected in said user interface specification.

2. The method as recited in claim 1 further comprising:
    implementing said recommended changes to said user interface specification in response to said user accepting said recommended changes.

3. The method as recited in claim 1 further comprising:
    implementing appropriate changes to said user interface specification in response to detecting said modification to said user interface code affecting said user interface specification, wherein said changes implemented to said user interface specification are based on said link between said one or more sections of user interface code and said corresponding sections of said user interface specification.

4. The method as recited in claim 1 further comprising:
    highlighting portions of said user interface specification to be changed to correspond with said update to said user interface in response to detecting said modification to said user interface code affecting said user interface specification.

5. A computer program product embodied in a non-transitory computer readable storage medium for ensuring a user interface specification accurately describes its corresponding user interface, the computer program product comprising the programming instructions for:
    linking one or more sections of user interface code with one or more user interface objects;
    linking said one or more sections of said user interface code with corresponding sections of said user interface specification, wherein said user interface specification is a document that captures details of said user interface, wherein said details comprise actions of an end user and visual and auditory interaction elements;
    detecting a modification to said user interface code;
    determining whether a modification to said user interface corresponding to said detected modification of said user interface code affects said user interface specification;
    not notifying a user regarding an update to said user interface in response to said modification to said user interface code not affecting said user interface specification, wherein said modification to said user interface code does not affect said user interface specification in response to said modification to said user interface code representing changes that are not reflected visually;
    notifying said user that said user interface specification needs to be updated in response to detecting said modification to said user interface code affecting said user interface specification which reflects an update to said user interface; and
    recommending appropriate changes to said user interface specification in response to detecting said modification to said user interface code affecting said user interface specification, wherein said recommended changes to said user interface specification are based on said link between said one or more sections of said user interface code and said corresponding sections of said user interface specification, wherein said recommended changes include one or more identifiers of changes to one or more user interface objects that need to be reflected in said user interface specification.

6. The computer program product as recited in claim 5 further comprising the programming instructions for:
    implementing said recommended changes to said user interface specification in response to said user accepting said recommended changes.

7. The computer program product as recited in claim 5 further comprising the programming instructions for:
    implementing appropriate changes to said user interface specification in response to detecting said modification to said user interface code affecting said user interface specification, wherein said changes implemented to said user interface specification are based on said link between said one or more sections of user interface code and said corresponding sections of said user interface specification.

8. The computer program product as recited in claim 5 further comprising the programming instructions for:

highlighting portions of said user interface specification to be changed to correspond with said update to said user interface in response to detecting said modification to said user interface code affecting said user interface specification.

9. A system, comprising:

a memory unit for storing a computer program for ensuring a user interface specification accurately describes its corresponding user interface; and a processor coupled to said memory unit, wherein said processor, responsive to said computer program, comprises:

circuitry for linking one or more sections of user interface code with one or more user interface objects;

circuitry for linking said one or more sections of said user interface code with corresponding sections of said user interface specification, wherein said user interface specification is a document that captures details of said user interface, wherein said details comprise actions of an end user and visual and auditory interaction elements;

circuitry for detecting a modification to said user interface code;

circuitry for determining whether a modification to said user interface corresponding to said detected modification of said user interface code affects said user interface specification;

circuitry for not notifying a user regarding an update to said user interface in response to said modification to said user interface code not affecting said user interface specification, wherein said modification to said user interface code does not affect said user interface specification in response to said modification to said user interface code representing changes that are not reflected visually;

circuitry for notifying said user that said user interface specification needs to be updated in response to detecting said modification to said user interface code affecting said user interface specification which reflects an update to said user interface; and circuitry for recommending appropriate changes to said user interface specification in response to detecting said modification to said user interface code affecting said user interface specification, wherein said recommended changes to said user interface specification are based on said link between said one or more sections of said user interface code and said corresponding sections of said user interface specification, wherein said recommended changes include one or more identifiers of changes to one or more user interface objects that need to be reflected in said user interface specification.

10. The system as recited in claim 9, wherein said processor further comprises:

circuitry for implementing said recommended changes to said user interface specification in response to said user accepting said recommended changes.

11. The system as recited in claim 9, wherein said processor further comprises:

circuitry for implementing appropriate changes to said user interface specification in response to detecting said modification to said user interface code affecting said user interface specification, wherein said changes implemented to said user interface specification are based on said link between said one or more sections of user interface code and said corresponding sections of said user interface specification.

12. The system as recited in claim 9, wherein said processor further comprises:

circuitry for highlighting portions of said user interface specification to be changed to correspond with said update to said user interface in response to detecting said modification to said user interface code affecting said user interface specification.

* * * * *